US012624721B2

(12) United States Patent
Schneider et al.

(10) Patent No.: US 12,624,721 B2
(45) Date of Patent: May 12, 2026

(54) SCREW WITH SEPARATE THREAD HELIX AND INTEGRAL THREAD START

(71) Applicant: Hilti Aktiengesellschaft, Schaan (LI)

(72) Inventors: Roland Schneider, Schlins (AT);
Florian Zielbauer, Rüthi (CH);
Christian Gebauer, Altstätten (CH);
Guenter Domani, Weissensberg (DE)

(73) Assignee: Hilti Aktiengesellschaft, Schaan (LI)

( * ) Notice: Subject to any disclaimer, the term of this patent is extended or adjusted under 35 U.S.C. 154(b) by 224 days.

(21) Appl. No.: 17/922,189

(22) PCT Filed: May 18, 2021

(86) PCT No.: PCT/EP2021/063154
§ 371 (c)(1),
(2) Date: Oct. 28, 2022

(87) PCT Pub. No.: WO2021/239518
PCT Pub. Date: Dec. 2, 2021

(65) Prior Publication Data
US 2023/0175543 A1 Jun. 8, 2023

(30) Foreign Application Priority Data
May 28, 2020 (EP) .................................... 20177114

(51) Int. Cl.
*F16B 25/00* (2006.01)
(52) U.S. Cl.
CPC ...... *F16B 25/0094* (2013.01); *F16B 25/0026* (2013.01); *F16B 25/0073* (2013.01)
(58) Field of Classification Search
CPC .............. F16B 25/0026; F16B 25/0094; F16B 25/0073; F16B 37/12; A16B 17/8685; A16B 17/869

(Continued)

(56) References Cited

U.S. PATENT DOCUMENTS 2,520,232 A 8/1950 Bohdan et al.
4,022,099 A * 5/1977 Ballantyne .......... F16B 25/0021
411/383

(Continued)

FOREIGN PATENT DOCUMENTS

CN 103200887 A 7/2013
CN 108138827 A 6/2018

(Continued)

OTHER PUBLICATIONS

International Search Report of PCT/EP2021/063154 dated Jul. 30, 2021.

(Continued)

*Primary Examiner* — Christine M Mills
*Assistant Examiner* — Dil K. Magar
(74) *Attorney, Agent, or Firm* — Davidson Kappel LLC

(57) ABSTRACT

A screw including a shank having a tip end and a rear end, which is located opposite the tip end, and at least one screw thread, which is arranged on the shank, which winds around the shank and which protrudes from the shank, wherein the screw thread includes a separate screw thread section, which is constituted by a separate helix element that is non-monolithically arranged on the shank. The at least one screw thread includes a thread start, which extends further towards the tip end than does the separate screw thread section, and which forms a generally helical continuation of the separate screw thread section, wherein the thread start and the shank are monolithic.

19 Claims, 2 Drawing Sheets

(58) Field of Classification Search
USPC ................. 411/411, 251, 309, 425, 305, 412
See application file for complete search history.

(56) References Cited

U.S. PATENT DOCUMENTS

| | | | |
|---|---|---|---|
| 4,075,925 A * | 2/1978 | Lerich ................. | F16B 13/0883 411/17 |
| 4,861,206 A * | 8/1989 | Riedel .................. | F16B 13/061 411/36 |
| 5,332,153 A * | 7/1994 | Leibhard .................. | E01B 9/14 238/373 |
| 6,074,149 A * | 6/2000 | Habermehl ........... | F16B 35/044 206/347 |
| 6,276,883 B1 * | 8/2001 | Unsworth ............... | F16B 37/12 411/16 |
| 6,494,657 B2 * | 12/2002 | Unsworth ........... | F16B 25/0031 411/16 |
| 6,854,942 B1 * | 2/2005 | Hargis ................ | F16B 25/0057 411/533 |
| 7,182,159 B2 * | 2/2007 | Linden ................ | E21B 17/0426 175/320 |
| 7,935,138 B1 | 5/2011 | Richelsoph et al. | |
| 8,192,123 B2 * | 6/2012 | Ernst .................... | F16B 25/106 411/387.1 |
| 8,430,617 B2 | 4/2013 | Hettich et al. | |
| 2002/0081171 A1 * | 6/2002 | Werner .............. | F16B 25/0047 411/423 |
| 2005/0069396 A1 * | 3/2005 | Wu ..................... | F16B 25/0068 411/411 |
| 2007/0065255 A1 * | 3/2007 | Liu ..................... | F16B 25/0073 411/411 |
| 2008/0080951 A1 * | 4/2008 | Lin ..................... | F16B 25/0073 411/387.6 |
| 2008/0232926 A1 * | 9/2008 | Hsu ..................... | F16B 25/0057 411/412 |
| 2009/0110514 A1 * | 4/2009 | Huber ................. | F16B 25/0026 411/386 |
| 2009/0269164 A1 * | 10/2009 | Gonciarz ............ | F16B 25/0068 411/416 |
| 2010/0247267 A1 | 9/2010 | Bianchi et al. | |
| 2010/0290858 A1 * | 11/2010 | Hettich ............... | F16B 25/0026 411/21 |
| 2011/0106172 A1 | 5/2011 | Wallenstein et al. | |
| 2011/0142569 A1 | 6/2011 | Hagel et al. | |
| 2011/0238124 A1 * | 9/2011 | Richelsoph .......... | A61B 17/863 606/313 |
| 2012/0101534 A1 | 4/2012 | Pitladdo et al. | |
| 2013/0079829 A1 | 3/2013 | Globerman et al. | |
| 2013/0302111 A1 * | 11/2013 | Shih .................... | F16B 25/0026 411/387.4 |
| 2015/0105830 A1 * | 4/2015 | Biedermann ...... | A61B 17/8625 606/317 |
| 2016/0003284 A1 * | 1/2016 | Neumaier .......... | F16B 25/0078 411/387.2 |
| 2018/0283435 A1 * | 10/2018 | Hakenholt .......... | F16B 25/0026 |
| 2020/0063231 A1 | 2/2020 | Schneider et al. | |

FOREIGN PATENT DOCUMENTS

| | | |
|---|---|---|
| CN | 208371870 U | 1/2019 |
| DE | 8713708 U1 | 11/1987 |
| DE | 102015214257 A1 | 2/2017 |
| EP | 3620672 A1 | 3/2020 |
| EP | 3620673 A1 | 3/2020 |
| EP | 3736458 A1 | 11/2020 |
| EP | 3869051 | 8/2021 |
| EP | 3966460 A1 | 3/2022 |
| WO | WO2020225004 | 11/2020 |
| WO | WO2021239517 A1 | 12/2021 |

OTHER PUBLICATIONS

International Search Report of PCT/EP2021/063153 dated Aug. 2, 2021.

* cited by examiner

SCREW WITH SEPARATE THREAD HELIX AND INTEGRAL THREAD START

The invention relates to a screw. A screw of this type comprises a shank having a tip end and a rear end, which is located opposite the tip end, and at least one screw thread, which is arranged on the shank, which winds around the shank and which protrudes from the shank, wherein the screw thread comprises a separate screw thread section, which is constituted by a separate helix element that is non-monolithically arranged on the shank.

BACKGROUND

US20100247267 A1 discloses concrete screws, i.e. screws that can be tappingly screwed into a borehole in a concrete substrate. The screws of US20100247267 A1 are monolithic throughout.

US20180283435 A1 discloses a concrete screw that has a separate helix element which is separate from the shank. The separate helix element is located in a receiving groove, which is provided within the shank. The receiving groove has an inclined rearwardly facing wedge flank. The receiving groove also has an inclined forwardly facing flank, but in contrast to the rearwardly-facing flank, the forwardly facing flank is relatively steep.

US20110142569 A1 discloses a concrete screw, wherein most of the screw thread is monolithic with respect to the shank, except for the region closest to the tip end, which is a separate part. The material of this separate part is chosen for tapping concrete.

EP3620673 A1 and EP3620672 A1 disclose further concrete screws with separate thread parts, which are intended to tap into concrete, wherein a rear section of the respective screw thread can again be monolithic with respect to the shank.

Another screw with a separate helix element is described in European patent application number 20158000.8, published as EP3869051. This application proposes to use stainless steels of specific hardness values for the separate helix element and for the shank.

European patent application number 19172762.7, published as EP3966460 A1, also relates to a concrete screw having a separate helix element. In this case, it is proposed to provide the separate helix element with slots, which are intended to facilitate radial expansion.

US20100290858 A1 (EP2185829 B1) discloses screws comprising a shank-like element and a separate helix element attached thereto. According to US20100290858 A1, the separate helix element or the shank-like element, respectively, can be provided with recesses arranged at regular distances, wherein the respective other element (i.e. the shank-like element or the separate helix element, respectively), are provided with matching projections, which can engage with the recesses. Moreover, the separate helix element can be welded or bonded on the periphery of the shaft.

US20200063231 A1 describes a martensitically hardenable steel and its use in concrete screws.

DE8713708 U1 describes a screw connection consisting of two elements comprising a helical thread groove each; these elements are joined by a separate helical element providing positive locking.

DE102015214257 A1 describes a shaft-hub connection, in which the shaft has an external toothing and a coaxially arranged hub has a corresponding internal toothing.

SUMMARY OF THE INVENTION

It is an object of the invention to provide a screw that has particularly good performance, resistance and/or installation properties.

In an inventive screw, the at least one screw thread comprises a thread start, which extends further towards the tip end than does the separate screw thread section, and which, in particular, forms a generally helical continuation of the separate screw thread section, wherein the thread start and the shank are monolithic.

In connection with the invention, it was found that when a concrete tapping screw is provided with a separate helix element, the tapping forces which arise during installation of the screw tend unwind the separate helix element from the shank. As a consequence, a particularly strong connection between the separate helix element and the shank is required, which can make manufacturing complex and/or expensive. In view of this, the present invention provides the shank with a thread start, which leads the separate helix element during installation of the screw, and provides this thread start monolithically with respect to the shank. This thread start can shield the trailing separate helix element at least partly from the arising concrete and therefore from tapping forces, and can therefore efficiently counteract the above-mentioned unwinding tendency. Since the thread start is monolithic with respect to the shank, its tendency to separate from the shank is usually significantly smaller as compared to separate helix elements. Thus, a particularly robust-performing screw can be manufactured at particularly low effort and cost. In addition, the integral thread start can contribute to the fixation of the separate helix element on the shank, which can further facilitate manufacturing.

The shank is an elongate member and can, and in particular, be generally cylindrical, more preferably circular cylindrical, possibly including a helical groove that accommodates the separate helix element. The tip end and the rear end, respectively, constitute opposite ends of the shank. In particular, the shank comprises a longitudinal axis, which in particular extends through the rear end and through the tip end of the shank. The tip end is that end of the shank that is intended to be inserted first into a borehole when the screw is installed. The shank might be pointed at the tip end, but is preferably blunt at the tip end, in particular if the screw is a concrete screw. The screw would also comprise a drive for imparting torque on the shank. The drive could be located at the rear end of the shank, for example if the drive is a head, but it could also be located within the shank, for example if the screw is a headless screw.

The at least one screw thread is usually generally helical, but could deviate from a strict mathematical helix, e.g. in order to provide additional functionality. The at least one screw thread winds around the shank and the longitudinal axis of the shank, i.e. it turns helically around the shank, in particular by one or more turns, more preferably by at least two or three turns. The screw thread is an external thread. It radially protrudes from the shank and can engage a mating internal thread.

The at least one screw thread is preferably continuous, but could also have interruptions. For example, it could have a sawtooth structure at least in some regions, in particular within the thread start. The screw could also be provided with cutting bodies embedded in the screw thread, in particular in the thread start.

For a particular easy design, the screw can comprise only a single screw thread. However, additional screw threads might also be provided, e.g. for additional functionality.

These additional screw threads might be axially overlapping or non-overlapping with respect to the at least one screw thread and might be designed differently from the at least one screw thread or in analogy thereto.

The separate screw thread section extends along the longitudinal axis of the shank. The separate screw thread section is usually generally helical, but could deviate from a strict mathematical helix, e.g. in order to provide additional functionality. The separate screw thread section winds around the shank and the longitudinal axis of the shank, i.e. it turns helically around the shank, in particular by one or more turns, more preferably by at least two turns. The separate screw thread section forms an external thread.

The separate helix element is non-monolithically connected to the shank, in particular so as to transfer tensile pull-out forces directed along the longitudinal axis of the shank from the shank into the separate helix element, so that pull-out load can be transferred from the shank via the separate helix element into the surrounding substrate. Pull-out forces, in this connection, are rearwardly directed forces. The separate helix element is preferably tightly connected to the shank, but might be also connected with some play, e.g. for additional functionality.

The separate helix element extends along the longitudinal axis of the shank. The separate helix element is usually generally helical, but could deviate from a strict mathematical helix, e.g. in order to provide additional functionality. The separate helix element winds around the shank and the longitudinal axis of the shank, i.e. it turns helically around the shank, in particular by one or more turns. In particular, the separate helix element can have a crest, which radially protrudes from the shank and which constitutes the separate screw thread section, as well as a root, which is embedded in the shank, preferably so as to connect the separate helix element to the shank.

The thread start is monolithically connected to the shank, in particular so as to transfer tensile pull-out forces directed along the longitudinal axis of the shank from the shank into the thread start, so that pull-out load can be transferred from the shank via the thread start into the surrounding substrate.

The thread start extends along the longitudinal axis of the shank. The thread start is usually generally helical, but could also deviate from a strict mathematical helix, e.g. in order to provide additional functionality. The thread start winds around the shank and its longitudinal axis, i.e. it turns helically around the shank, preferably by at least a half turn, more preferably by at least one turn. Advantageously, the thread start has more than a half turn, but less than two turns or three turns. The thread start protrudes radially from the shank.

The thread start and the separate screw thread section are longitudinally offset with respect to one another, preferably with some minor overlap only where the thread start and the separate screw thread section adjoin.

In particular, the thread start forms a—in particular generally—helical continuation of the separate screw thread section, more specifically a generally helical tipward continuation of the separate screw thread section. Accordingly, the thread start and the separate screw thread section are in generally helical prolongation with each other and/or the thread start can at least partly shield the separate screw thread section from the substrate as the screw is screwed into the substrate, in particular tappingly screwed into the substrate (which substrate is preferably concrete). The thread start and the separate screw thread section are helically aligned with each other, such that both of these generally helical structures form, taken together, the generally helical screw thread. The thread start forms a leading thread leading the separate screw thread section. In particular, the thread start can have longitudinal overlap with the separate screw thread section where it adjoins the separate screw thread section. The thread start is located closer to the tip end than is the separate screw thread section. In particular, the thread start is, axially, located between the separate helix element and the tip end. The thread start is located near the tip end of the shank, preferably adjacent thereto. In particular, the separate screw thread section extends further towards the rear end of the shank than does the thread start. In particular, the separate screw thread section ends where the thread start starts and vice versa.

The thread start and the shank are monolithic. Accordingly, they consist of one piece, are solid and unbroken, are manufactured from the same piece of material and/or arranged without joints or seams. The thread start is thus an integral thread start. In contrast, the separate helix element and the shank are non-monolithic with respect of one another. Accordingly, they are separate pieces, and/or at least one joint or seam is provided. In particular, the separate helix element and the shank, respectively, can be manufactured from different pieces of material and/or separately from one another, and joined afterwards.

Preferably, the screw thread consists of the separate screw thread section and the thread start only, without additional screw thread sections being provided. In this case, the separate screw thread section is the rear section of the screw thread. The separate screw thread section can extend continuously from the integrally formed thread start towards the rear end of the screw. Preferably, there is no additional screw thread section of the at least one screw thread, at least no additional screw thread section that is monolithic with respect to the shank, located between the separate screw thread section and the rear end of the shank and/or the head.

The thread start can have three functions: i) tapping of the substrate thread (in particular of the concrete substrate thread) during installation, ii) providing smooth and continuously increasing tapping action with increasing outer thread diameter (up to same outer thread diameter as the separate screw thread section or larger) and/or iii) radial and/or lateral fixation of the separate helix element at the front face of the separate helix element at the tip side. In particular, the thread tapping action of the screw can be concentrated on the thread start, whereas the separate screw thread section has primarily holding function but no significant tapping function.

Where used, the terms "axially", "longitudinally", "radially" and "circumferentially" can refer, in particular, to the longitudinal axis of the shank, which might coincide with the longitudinal axis of the entire screw.

It is particularly preferred that the thread start consists of a first material and the separate helix element consists of a second material, wherein the first material and the second material are different materials. Since the thread start and the shank are monolithic, the shank also consists of said first material. Employing different materials for the different elements allows to resolve conflicting objectives regarding the materials in a particular easy manner.

The first material (i.e. that of the thread start and the shank) could for example be a metal material (for example steel, aluminium, titanium) or a plastic material. The second material (i.e. that of the separate helix element) can for example be a metal material (steel, aluminium, titanium, hard metals), a plastics material or a ceramic material.

In particular, the present invention can be used for screws intended for indoor applications. In this case, both the first material and the second material could be preferably carbon steels, however preferably of different type.

The present invention could also be used for screws intended for outdoor applications. In this case, the following configurations can be, in particular, envisaged:

Both the first material and the second material are stainless steels, however preferably of different type.

The first material (i.e. that of the thread start and the shank) is a carbon steel provided with a corrosion protection coating applied at least on the shank, and the second material (i.e. that of the separate helix element) is a stainless steel.

The first material (i.e. that of the thread start and the shank) is a stainless steel, and the second material (i.e. that of the separate helix element) is a carbon steel provided with a corrosion protection coating applied on the separate helix element.

In case of outdoor applications, providing the first material (i.e. that of the thread start and the shank) with corrosion protection, either intrinsically or by means of a coating, can allow to use the full length of the embedded screw thread, including the thread start, for load transfer.

Preferably, both the first material and the second material are metal materials, in particular steel materials.

The first material (i.e. that of the thread start and the shank) can for example be an austenitic (e.g. 1.4404, 1.4301, 1.4529, or similar), a duplex (e.g. 1.4062, 1.4162, 1.4362, 1.4410, 1.4509, or similar), a ferritic (e.g. 1.4105, 1.4113, 1.4521, or similar) or a PH stainless steel (e.g. 15-5 PH or similar).

The second material (i.e. that of the separate helix element) can for example be an austenitic (e.g. 1.4565/1.4566, 1.3808, or similar), a martensitic (e.g. 1.4108, 1.4109, 1.4116, 1.4122, the steel grade described in US20200063231 A1) or a PH stainless steel (e.g. 17-7 PH).

It is particular advantageous that the second material (i.e. that of the separate helix element) is a steel material, preferably a stainless-steel material, having a Vickers hardness between 550 HV10 and 800 HV10, preferably between 650 HV10 and 750 HV10, wherein Vickers hardness is in particular according to ISO 6507. Accordingly, the second steel material, which is used for the screw thread helix, has a relatively high hardness, which corresponds to a relatively high steel resistance, what can be advantageous in order to efficiently transfer loads between the external screw thread and the internal substrate thread, especially in localized or point-to-point contact situations. Moreover, a high strength level of the separate helix element can provide a particularly high design freedom, for example regarding the cross section geometry of the separate helix element. For example, the thread cross section of the separate helix element can be made relatively narrow (thread flank angles of 30°-45° instead of 40-50° can be envisaged), which still provides high structural resistance, but with improved installation performance due to reduced tapping action.

According to a further preferred embodiment of the invention, the first material (i.e. the shank's and the thread start's material) is a steel material, preferably a stainless-steel material, having a Vickers hardness between 400 HV10 and 800 HV10, wherein Vickers hardness is in particular according to ISO 6507. This range of hardness of the thread start can provide adequate robustness to provide tapping action in substrates such as concrete.

It is particularly preferred that the maximum outline, i.e. the maximum thread cross section in a longitudinal plane, of the thread start is at least equal size, preferably larger, than the maximum outline of the separate screw thread section.

This can concentrate the tapping action to the thread start, which can provide particularly good tapping performance. For the same reason, it is preferred that the thread start has a maximum outer thread diameter which is at least equal to a maximum outer thread diameter of the separate screw thread section.

Advantageously, the thread start includes a helix element overlapping portion, which overlaps the separate helix element, in particular in the radial and/or axial direction. Accordingly, the separate helix element can be sandwiched, in particular in the radial direction, between the shank and the helix element overlapping portion, and/or the separate helix element can be sandwiched, in particular in the axial direction, within a fork formed by the helix element overlapping portion. This can provide particularly good fixation of the separate helix element at its front face by means of radial and/or lateral clamping effected by the helix element overlapping portion. By means of this, radial up-bending of the separate helix element during installation of the screw can be counteracted particularly efficiently.

In particular, the maximum outer thread diameter of the thread start can be present at the helix element overlapping portion (or close to the intersection area).

As already mentioned above, the screw is preferably a concrete screw, i.e. the screw, in particular the screw thread thereof, is able to, at least partly, tap its mating internal screw thread groove in a concrete substrate. In particular, a ratio of the maximum outer thread diameter of the screw thread to the pitch of the screw thread can be between 1 and 2, in particular between 1.2 and 1.6, at least in some regions of the screw thread, more preferably at least in some regions of the screw thread located near the tip end, most preferably throughout the screw thread. These are typical dimensions for concrete screws.

BRIEF DESCRIPTION OF THE DRAWINGS

The invention is explained in greater detail below with reference to preferred exemplary embodiments, which are depicted schematically in the accompanying drawings. Individual features of the exemplary embodiments presented below can be implemented either individually or in any combination within the scope of the present invention.

DETAILED DESCRIPTION

Figure 1:
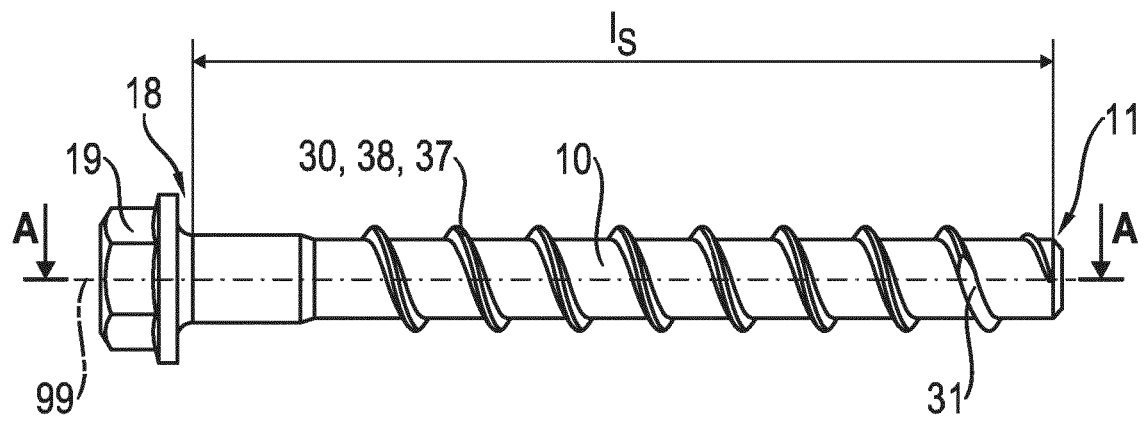
FIG. 1 is a side view of a concrete screw.
Figure 2:
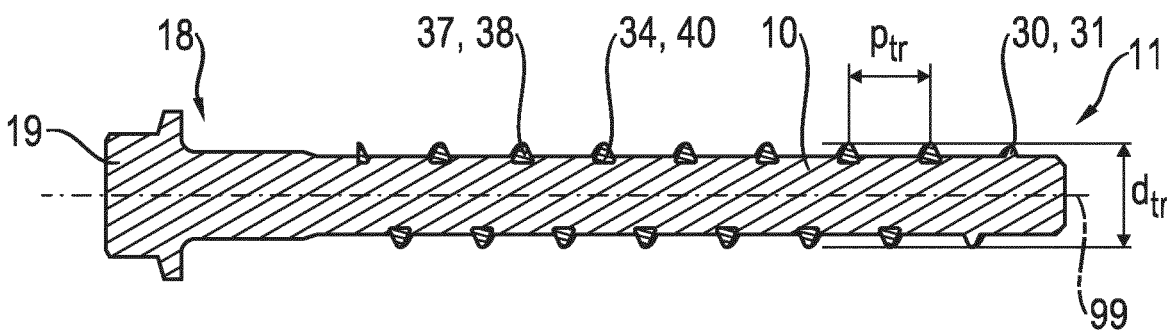
FIG. 2 is a cross-sectional view A-A of the screw of FIG. 1, in which the cross-sectional plane is a longitudinal plane that includes the longitudinal axis of the shank.

FIGS. 1 to 4 illustrate an embodiment of an inventive screw. The screw comprises an elongate shank 10, which has a tip end 11. The tip end 11 is the leading end of the shank 10 and the shank 10 is intended to be inserted with the tip end 11 first into a borehole when the screw is installed. The shank 10 also has rear end 18, which is located opposite the tip end 11. The screw furthermore has a screw drive 19 that is connected to the shank 10, monolithically in the present case by way of example, for applying torque to the shank 10. In the shown embodiment, the screw drive 19 is a hex head located at the rear end 18, but this is an example only. Any other type of screw drive 19 can be used, such as an external type, for example hex, line (ALH), square, or a socket head, for example Bristol, clutch, double hex, hex socket, hexalobular socket, line (ALR), polydrive, Robertson, spline, TP3, and others. The screw drive 19 could also be located within the shank 10 and/or remote from the rear end 18, in particular if the screw is headless and/or internally threaded.

The elongate shank 10 comprises a longitudinal axis 99, extending in the longitudinal direction of the shank 10 and through both the tip end 11 and through the rear end 18.

The screw furthermore comprises a screw thread 30, which is located on the shank 10, which winds around the shank 10 and/or the longitudinal axis 99, and which projects radially, with respect to the longitudinal axis 99, from the shank 10. The screw thread 30 is an external screw thread.

The screw thread 30 comprises at least two distinct helical sections, namely a separate screw thread section 38 and a thread start 31, which is located in front of the separate screw thread section 38. The separate screw thread section 38, in particular the tipward end thereof, and the thread start 31, in particular the rearward end thereof, are helically aligned with each other to constitute at least parts of the screw thread 30. In the present embodiment, they constitute the entirety of the screw thread 30, but this is an example only. The thread start 31 is located axially in front of separate screw thread section 38, i.e. the thread start 31 extends further towards the tip end 11 than does the separate screw thread section 38. The separate screw thread section 38 reaches further towards the rear end 18 of the shank 10 than does the thread start 31. The separate screw thread section 38 is thus located rearwardly of the thread start 31. The thread start 31 and the separate screw thread section 38 are located adjacent to one another. In the shown embodiment, they are in contact with one another, but there might also be some gap between the thread start 31 and the separate screw thread section 38, e.g. due to manufacturing tolerances. Both the thread start 31 and the separate screw thread section 38 wind around the shank 10 and/or around the longitudinal axis 99.

In the shown embodiment, the thread start 31 has approximately one turn. However, a thread start 31 which is shorter and has less than one turn, or a thread start 31 which is longer, having more than one turn, can also be envisaged, but advantageously, the thread start 31 has less than two turns. The separate screw thread section 38 has a plurality of turns, namely approximately nine turns in the shown embodiment. Preferably, it has at least two turns.

The separate screw thread section 38 is constituted by a separate helix element 37, in particular by a helical crest of the separate helix element 37. The separate helix element 37, which is a part of the screw, is located on the shank 10, and which winds around the shank 10 and/or the longitudinal axis 99. In particular, the separate helix element 37 is arranged coaxially with respect to the shank 10. Whereas the thread start 31 and the shank 10 are monolithic with respect to one another, the separate helix element 37 and the shank 10 are non-monolithic with respect to one another. Due to the latter, the separate screw thread section 38 and the shank 10 are non-monolithic with respect to one another.

The shank 10, and therefore also the monolithic thread start 31, consist of a first material. The separate helix element 37, and therefore also the separate screw thread section 38, consist of a second material. In the present embodiment, the first material and the second material are different materials. The second material can in particular be a metal material, preferably a steel material, most preferably a stainless steel. The first material can in particular be a metal material, preferably a steel material, most preferably a stainless steel. The shank 10, the monolithic thread start 31, the separate screw thread section 38 and/or the separate helix element 37 could also be provided with a respective coating, comprising one or more layers.

In the present embodiment, the screw thread 30 spans, longitudinally (i.e. in the direction parallel to the longitudinal axis 99), approximately 80% of the length $I_s$ of the shank 10. The screw thread 30 thus forms a main thread of the screw. The thread start 31 spans approximately 10% of the length $I_s$ of the shank 10 and the separate screw thread section 38 spans approximately 70% of the length $I_s$ of the shank 10. The ratio of the length of the thread start 31 to the length of the separate screw thread section 38 is about 14% in this embodiment. Whereas in the shown embodiment, no additional screw threads are shown, the screw might also have additional screw threads, formed monolithically or non-monolithically with respect to the shank 10.

The separate helix element 37 and therefore the separate screw thread section 38 is fixed to the shank 10. In the shown embodiment, this fixation is tight, but it might also allow some displacement, in particular axial displacement, of the separate screw thread section 38 with respect to the shank 10. In the shown embodiment, fixation of the separate helix element 37 on the shank 10 is provided at a helical root 34 of the separate helix element 37, which root 34 is arranged within a helical groove 40 provided within the shank 10. In particular, the groove 40 has an undercut structure and the root 34 a corresponding structure that corresponds to the undercut structure. In the present embodiment, the undercut structure of the groove 40 is a female dovetail, and the corresponding structure of the root 34 is a male dovetail. However, other undercut structures such as T-structures could also be envisaged. Other types of connections, such as frictional connections or material connections (for example gluing, soldering or welding) could also be provided in addition or as an alternative, in order to provide fixation of the separate helix element 37 on the shank 10.

The screw is a concrete screw, i.e. the screw thread 30, in particular the thread start 31, is able to tap, in particular cut, a corresponding mating thread in a concrete substrate. The screw thread 30 has an outer thread diameter $d_{tr}$. At least near the tip end 11 of the non-installed screw, a ratio of the maximum outer thread diameter $d_{tr}$ of the screw thread 30 to the pitch $p_{tr}$ of the screw thread 30 is between 1 and 2, in particular between 1.2 and 1.6.

The screw thread 30 might be strictly mathematically helical, but might also deviate from a helical form, which can e.g. provide additional functionality.

Figure 3:
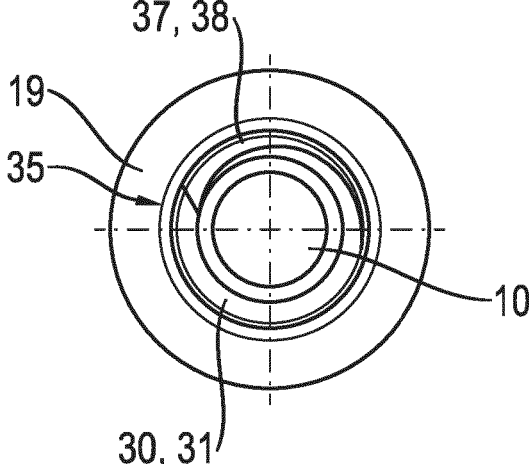
FIG. 3 is a front view of the screw of FIG. 1.

As can be seen in FIG. 3, the thread start 31 comprises a helix element overlapping portion 35. This helix element overlapping portion 35 covers, in particularly radially and/or axially, the separate helix element 37, in particular the separate screw thread section 38 thereof. In particular, the helix element overlapping portion 35 forms a holding-down claw for securing the tipward end of the separate helix element 37 on the shank 10, which holds the separate helix element 37 between the helix element overlapping portion 35 and the shank 10 in the radial direction. In addition, the helix element overlapping portion 35 can provide a bifurcation, in which the separate helix element 37 is embedded in the axial direction so as to laterally support the separate helix element 37.

As can also be seen in FIG. 3, the outer diameter of the thread start 31 continuously increases, starting from the diameter of the shank 10, towards the level of the outer diameter of the separate screw thread section 38.

Figure 4:
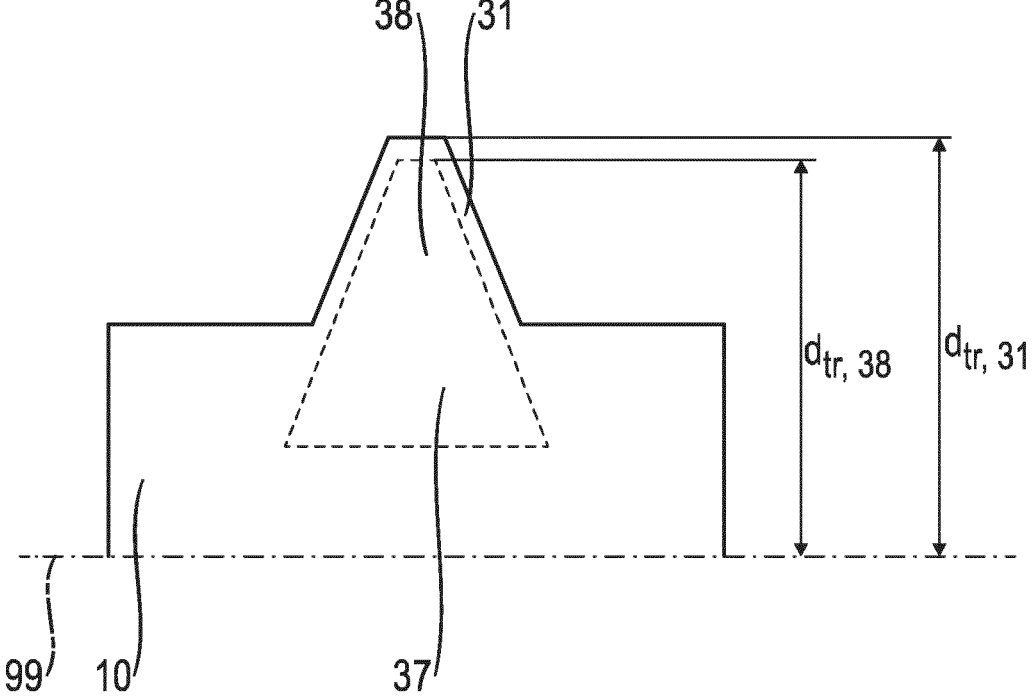
FIG. 4 shows, in a single drawing, the outlines of both the thread start and of the separate helix element of the screw of FIG. 1, in a cross-sectional view in which the cross-sectional plane is a longitudinal plane that includes the longitudinal axis of the shank.

As can be gathered from FIG. 4, the maximum outline, i.e. the maximum longitudinal thread cross-section, of the thread start 31 is slightly larger than that of the separate screw thread section 38. In particular the thread start 31 has a maximum outer thread diameter $d_{tr,\,31}$ which slightly larger than a maximum outer thread diameter $d_{tr,\,38}$ of the separate screw thread section 38. As a consequence, substrate tapping action, in particular concrete substrate tapping action, will concentrate on the integral thread start 31. The thread start 31 thus forms the tapping section of the screw, whereas the separate screw thread section 38 forms the load bearing section of the screw.

What is claimed is:

1. A screw comprising:

a shank having a tip end and a rear end located opposite the tip end; and at least one screw thread arranged on the shank to wind around the shank and protrude from the shank, the screw thread including a separate screw thread section constituted by a separate element formed in a shape of a helix non-monolithically arranged on the shank, the at least one screw thread also including a thread start extending further towards the tip end than the separate screw thread section, the thread start and the shank being monolithic, wherein the thread start forms a helical continuation of the separate screw thread section.

2. The screw as recited in claim 1 wherein the thread start consists of a first material and the separate helix element consists of a second material, the first material and the second material being different materials.

3. The screw as recited in claim 2 wherein both the first material and the second material are metal materials.

4. The screw as recited in claim 3 wherein the metal materials are steel materials.

5. The screw as recited in claim 2 wherein the second material is a steel material having a Vickers hardness between 550 HV10 and 800 HV10.

6. The screw as recited in claim 5 wherein the second material has a Vickers hardness between 650 HV10 and 750 HV10.

7. The screw as recited in claim 2 wherein the first material is a steel material having a Vickers hardness between 400 HV10 and 800 HV10.

8. The screw as recited in claim 1 wherein a maximum outline of the thread start is at least equal size to a maximum outline of the separate screw thread section.

9. The screw as recited in claim 1 wherein a maximum outline of the thread start is larger than a maximum outline of the separate screw thread section.

10. The screw as recited in claim 1 wherein the thread start has a maximum outer thread diameter at least equal to a maximum outer thread diameter of the separate screw thread section.

11. The screw as recited in claim 1 wherein the thread start includes a helix element overlapping portion overlapping the separate helix element.

12. The screw as recited in claim 1 wherein the screw is a concrete screw.

13. The screw as recited in claim 1 wherein a ratio of the maximum outer thread diameter of the screw thread to the pitch of the screw thread is between 1 and 2 at least in some regions of the screw thread.

14. The screw as recited in claim 1 wherein a ratio of the maximum outer thread diameter of the screw thread to the pitch of the screw thread is between 1.2 and 1.6, at least in some regions of the screw thread.

15. The screw as recited in claim 1 wherein the separate screw thread section and the thread start are helically aligned with each other to constitute at least parts of the screw thread, and located adjacent to one another.

16. The screw as recited in claim 1 wherein the separate screw thread section reaches further towards the rear end of the shank than the thread start.

17. The screw as recited in claim 1 wherein the separate screw thread section has more turns than the thread start.

18. The screw as recited in claim 1 wherein the screw thread spans, parallel to a longitudinal axis, 80% of a length of the shank.

19. The screw as recited in claim 18 wherein the thread start spans, parallel to the longitudinal axis, 10% of the length of the shank, and the separate screw thread section spans parallel to the longitudinal axis, 70% of the length of the shank.

* * * * *